United States Patent Office 2,761,773
Patented Sept. 4, 1956

2,761,773

HERBICIDAL COMPOSITIONS

William R. Davie, Aliquippa, Pa., assignor to Pittsburgh, Coke & Chemical Company, Pittsburgh, Pa., a corporation of Pennsylvania No Drawing. Application April 21, 1954, Serial No. 424,774

22 Claims. (Cl. 71—2.6)

The present invention relates to new herbicidal esters of a mixture of primary saturated decyl alcohols containing a major proportion of trimethyl heptanols with an aryloxyacetic acid selected from the group consisting of phenoxyacetic acid, 2-methylphenoxyacetic acid, naphthoxy-acetic acid and halogenated derivatives thereof, and to herbicidal compositions containing such esters as the essential active ingredient.

The invention also comprehends concentrated solvent solutions of such esters, and solutions of such solvent solutions in fuel or diesel oil.

The invention further includes aqueous emulsions prepared from such solvent solutions.

FIELD OF INVENTION

In the past few years, aryloxyacetic acid esters, and in particular, the esters of 2,4-dichlorophenoxyacetic acid, 2,4,5-trichlorophenoxyacetic acid, and 4-chloro-2-methylphenoxyacetic acid have come into prominence as herbicides for the selective control of broad leaf weeds in narrow leaf grains and certain other crops or ornamental plants.

In order to practicably employ aryloxyacetic acid esters, and in particular, the esters of 2,4-dichlorophenoxyacetic acid, 2,4,5-trichlorophenoxyacetic acid, and 4-chloro-2-methylphenoxyacetic acid in herbicidal concentrated solvent solutions, it is vital that the solvent solution have many characteristics in addition to its mere ability to act as a herbicide. These characteristics are as follows:

(1) The concentrated solvent solution must be capable of being stored for long periods at low temperatures without having the ester crystallize out from the solution. If crystallization does occur, redissolution may be difficult. The presence of crystals in the concentrated solvent solution at the time of spraying leads to clogging of the spray equipment, renders accurate control of the distribution of the herbicide very difficult, decreases the effectiveness of a given quantity of herbicidal solution, and generally renders the solution unsatisfactory from a practical standpoint. Any effort to concentrate the solvent solution to as great an extent as possible antagonizes the problem of avoiding crystallization, since the original solution at normal temperatures would be closer to its saturation point. The need for low volatility further complicates this problem in view of the fact that low volatility is generally related to high molecular weight, which in turn is normally accompanied by solidity (high melting point) and limited solubility. A practical solvent solution should contain at least about four pounds of the acid in the form of the ester in a gallon of solution and must remain homogeneous at least down to temperatures of about 0° F.

(2) The solvent solution must be soluble in oils having low aromatic content. Since efficient application of the subject herbicides frequently requires the application of a fuel or diesel oil solution of the herbicide, it is essential that the ester selected have a high solubility in these oils which are generally poor solvents.

(3) It is vital that the ester possess low volatility. High volatility permits drift of the herbicidal vapors to susceptible plants, the injuring of which is not desired. There are, however, practical limits to the selection of a low volatile ester. The difficulty of mere resort to higher molecular weight esters has already been discussed in connection with the cold stability of the concentrated solvent solution, but it should additionally be noted that resort to esters of high molecular weight reduces the acid equivalency of the ester so that a greater weight of ester must be dissolved to make available in the solution a given quantity of the aryloxyacetic acid group. Consequently, mere resort to higher molecular weight esters means that more of a less soluble material must be maintained in solution. The increased cost of the high molecular weight alcohols necessary for the production of high molecular weight esters is another factor which makes it undesirable to resort to the simple expedient of utilizing high molecular weight esters.

(4) Herbicidal solvent solutions should have relatively low specific gravity (the specific gravity should not be too different from the specific gravity of water), so that stable aqueous emulsions can be readily produced. In other words, what is here required is that the specific gravity of the ester itself be very little above 1.2, and that the ester be soluble in a solvent having a specific gravity between 0.8 and 1.0, so that the solution of the ester in the solvent will have a specific gravity approximately equal to 1.0.

OBJECTS

A principal object of the present invention is the provision of new esters possessing herbicidal properties.

A more specific object of the invention is to provide a unique group of esters from a mixture of alcohols which have been found to be peculiarly adapted for the preparation of herbicides.

Further objects include:

(1) The provision of such esters which have very low vapor pressure, and at the same time, (a) have a relatively high acid equivalency, and (b) are highly soluble in conventional solvents so that concentrated solvent solutions may be prepared, capable of being stored for long periods at low temperatures without having the ester of crystallize out from the solution, and if crystallization does occur, the ester will redissolve easily when normal temperatures are restored.

(2) The provision of such esters as aforementioned, which esters are soluble in oils of low aromatic content so that oil solutions of the same may be prepared.

(3) The provision of such esters as aforementioned, concentrated solvent solutions of which will have a specific gravity approximately equal to 1.0, so that stable aqueous emulsions may be prepared from the same.

Further objects will be apparent from the listing of necessary characteristics in addition to mere herbicidal activity given hereinbefore, and the detailed description given hereinafter.

GENERAL DESCRIPTION

These objects are accomplished according to the present invention by the provision of the esters of an aryloxyacetic acid selected from the group consisting of phenoxyacetic acid, 2-methylphenoxyacetic acid, naphthoxyacetic acid, and halogenated derivatives thereof, with a mixture of alcohols comprising primary saturated decyl alcohols containing a major proportion of trimethyl heptanols.

These objects are preferably accomplished by the provision of new mixtures of esters of 2,4-dichlorophenoxyacetic acid, 2,4,5-trichlorophenoxyacetic acid or 4-chloro-2-methylphenoxyacetic acid with a mixture of primary saturated decyl alcohols containing a major proportion of trimethyl heptanols.

Such esters are compounded with solvents, extenders, wetting agents, other herbicidal materials or the like, to form new herbicidal compositions.

The success of the present invention is due to a large extent to the discovery that the aforesaid esters, in addition to possessing herbicidal properties, are still further characterized by the fact that they have (1) low volatility, (2) relatively high acid equivalency, (3) are readily soluble in conventional solvents, which solubility is maintained to an unusual extent at low temperatures, (4) are soluble in oils of low aromatic content, and (5) have a specific gravity under 1.2. Consequently, it has been found that the esters of aryloxyacetic acids with a mixture of primary saturated decyl alcohols containing a major proportion of trimethyl heptanols and, in particular, the 2,4-dichlorophenoxyacetic acid, 2,4,5-trichlorophenoxyacetic acid, and 4-chloro-2-methylphenoxyacetic acid esters with the aforesaid mixture of alcohols have the aforementioned attributes for use as herbicides or for the formation of herbicidal compositions.

EXAMPLES

A more complete understanding of the new products and compositions of this invention may be had by reference to the following illustrative examples of actual operations in accordance with the invention:

*Example I*

A mixture of esters of primary saturated decyl alcohols containing a major proportion of trimethyl heptanols with 2,4-dichlorophenoxyacetic acid may be prepared by heating under reflux with stirring for four hours and ten minutes a mixture of 884 grams (4.0 mols) of 2,4-dichlorophenoxyacetic acid, 664 grams (4.2 mols) of a mixture of primary saturated decyl alcohols containing a major proportion of trimethyl heptanols (5% excess) 1.2 milliliters of concentrated sulfuric acid and 300 milliliters of benzene. Suitable apparatus for performing the reaction may be equipped with a water trap so that the water produced by the reaction between the acid and the mixture of alcohols and which is distilled off together with the refluxing benzene may be withdrawn from the condensate before returning the benzene to the reaction vessel. At the end of this time, the organic acid content determined by titration was 0.5%. The resulting mixture was extracted with a 0.5% solution of sodium hydroxide and then washed with water. After separation of the mixture of esters from the benzene, which may be accomplished by distilling off the more volatile benzene, the material was heated under a vacuum of 20 millimeters to a temperature of 140° C. and filtered. The yield of the mixture of esters was 1,430 grams having a purity of 95.8% and, hence, the yield was 98.8% of that which theoretically could have occurred. The mixture of esters so produced has a boiling range at 0.3 millimeter pressure of approximately 154–163° C. and a boiling range at 1.1 millimeters pressure of 190–198° C. The mixture of esters is miscible in all proportions in fuel oil. The specific gravity of the mixture of esters is 1.122 at 27° C. The mixture of esters could not be crystallized at temperatures as low as 0° F. and ester formulations containing 4 lbs. per gallon equivalent of this mixture of esters also failed to show any signs of crystallization at temperatures of 0° F. The 2,4-dichlorophenoxyacetic acid ester so prepared was compared as to volatility with the 2,4-dichlorophenoxyacetic acid ester produced in accordance with the teachings of Example I of my copending application, Serial No. 322,828, and it was found that the 2,4-dichlorophenoxyacetic acid ester prepared as aforesaid was less volatile than the corresponding ester of 2,4-dichlorophenoxyacetic acid ester produced using the mixture of alcohols specified in the above referred to copending application. These volatility tests were conducted on a biological basis using tomato plants.

The 2,4,5-trichlorophenoxyacetic acid ester of a mixture of primary saturated decyl alcohols containing a major proportion of trimethyl heptanols may be prepared in the same manner employing 1,022 grams of 2,4,5-trichlorophenoxyacetic acid in place of the 884 grams of 2,4-dichlorophenoxyacetic acid employed in the above example. The reaction mixture was refluxed for one hour and twenty minutes, after which time 71.5 ccs. of water had been removed and the content of 2,4,5-trichlorophenoxyacetic acid in the resulting product was 0.65%. After washing with sodium hydroxide solution, distilling off the benzene and heating the mixture of esters to 140° C. under reduced pressure, a yield of 1,570 grams of ester of 98.2% purity was obtained. This is an actual yield of 97.3% of that which theoretically could have been obtained.

This mixture of esters has a boiling range at 0.35 millimeter pressure of 170–175° C. and a boiling range at 1.1 millimeters pressure of 199–208° C. The specific gravity of the distilled mixture of esters is 1.184 at 27° C. and is miscible in all proportions in fuel oil. The mixture of esters could not be crystallized at temperatures as low as 0° F. and ester formulations containing 4 lbs. per gallon equivalent of this mixture of esters also failed to show any signs of crystallization at temperatures of 0° F.

The corresponding mixture of esters with 4-chloro-2-methylphenoxyacetic acid had a boiling range at 0.3 millimeters of 143–152° C. and a boiling range at 1.1 millimeters of 173–188° C. The specific gravity of the distilled ester was 1.044 at 26° C. and was miscible in all proportions with fuel oil. Neither the distilled ester nor ester formulations containing 4 lbs. per gallon equivalent of 4-chloro-2-methylphenoxyacetic acid have crystallized at temperatures as low as 0° F.

Following the procedure outlined above using β-naphthoxyacetic acid, the corresponding mixture of esters obtained had a boiling range at 0.03 millimeter of 147° C. to 151° C. The specific gravity of the distilled ester was 1.02 at 32° C. and was miscible in all proportions with fuel oil. The distilled esters showed no tendency to crystallize even when stored at 0° F. for a long period of time.

A suitable mixture of primary saturated branched chain decyl alcohols containing a major proportion of trimethyl heptanols is commercially available as decyl alcohol (a product of the Oxo process in which carbon monoxide and hydrogen are catalytically caused to react with an olefine fraction [nonene isomers] obtained from a petroleum source) and has the following typical analysis:

| Test | Typical Analysis |
| --- | --- |
| Flash point | 210° F. |
| Specific gravity at 20° C./20° C | 0.837. |
| Viscosity at 20° C | 21.0 centipoises. |
| Distillation: | |
| Initial | 215° C. |
| Dry point | 222° C. |
| Water | 0.07%. |
| Hydroxyl number, mgm. KOH/gm | 349 (equivalent to 98.6% purity as $C_{10}H_{21}OH$). |
| Acidity as Acetic Acid | Less than 0.001%. |
| Sulfur, p. p. m | 2. |
| Carbonyl number, mgm. KOH/gm | 0.6. |
| Color, platinum-cobalt, p. p. m | Less than 5. |

Example II

The mixture of esters of 2,4,5-trichlorophenoxyacetic acid with a mixture of primary saturated decyl alcohols containing a major proportion of trimethyl heptanols produced in Example I may be employed to produce a concentrated solvent solution by dissolving 69% by weight of the ester mixture in 25% of a high boiling naphtha and then adding 6.0% of an emulsifying agent. Suitable emulsifying agents are nonionic emulsifiers such as those mentioned in the United States patent to Jones, No. 2,390,941, of December 11, 1945. The mixing may be conducted at room temperature. The concentrated solvent solution so prepared is a free flowing liquid even at temperatures below 0° F. The mixture of esters of 2,4,5-trichlorophenoxyacetic acid with a mixture of primary saturated decyl alcohols containing a major proportion of trimethyl heptanols of Example I may be used in conjunction with esters of other herbicidal acids to provide a concentrated solvent solution of esters of a plurality of herbicidal acids. For example, 35% by weight of the mixture of esters of 2,4,5-trichlorophenoxyacetic acid of Example I may be mixed with 38% of the mixture of esters of 2,4-dichlorophenoxyacetic acid of Example I, 6.0% of an emulsifying agent, and 21% of a high boiling naphtha to provide a suitable concentrated solvent solution of a mixture of herbicidal esters.

Example III

The concentrated solvent solutions of Example II may be dissolved in an oil solvent such as fuel oil, diesel oil or kerosene by mixing one gallon of the solution in 25 gallons of oil. The mixture is homogeneous, and does not separate when agitation is stopped, after mixing has taken place.

The mixture of oil and solvent solution so prepared may be employed upon stumps, used for dormant applications, and is effective against difficult-to-kill plants. A customary method of application of the above mixture is to apply the same as a spray from a plane, so that 26 gallons of the mixture is applied to four acres.

Example IV

The concentrated solvent solutions of Example II may be formed into a herbicidal aqueous emulsion useful for application to weeds and brush. The emulsion may be produced by mixing 3 quarts of the concentrated solvent solution with 100 gallons of water, and agitating slightly to give a uniform emulsion. This emulsion is quite stable and will remain as such with little or no further agitation.

DETAILED DESCRIPTION

It has been found that the characteristics noted above for the preparation of herbicidal solvent solutions eliminate substantially all known alcohols. Alcohols having less than six carbon atoms do not yield esters possessing sufficiently low volatility. Alcohols having more than ten carbon atoms yield esters which are insufficiently soluble and cause the resulting ester to possess a low acid equivalency. Cycloalkyl, heterocyclic and highly oxygenated alcohols yield esters which are not sufficiently soluble in oil, and are generally high melting. The heptyl and nonyl alcohols are not sufficiently available to constitute a feasible solution to the problem, even if one or more of them were, in fact, capable of doing so.

With reference to the octyl alcohols, n-octyl alcohol esters are insufficiently soluble at low temperatures, and 6-methyl heptanol-1 appears to be quite similar to n-octyl alcohol.

While 2-ethyl hexanol-1 esters are generally suitable as a satisfactory solution to the subject problem, as has been disclosed in my copending application, Serial No. 321,947, filed November 21, 1952, the use of the 2-ethyl hexanol-1 ester of the aforementioned aryloxyacetic acids leaves something to be desired, especially when it is employed with 2,4,5-trichlorophenoxyacetic acid.

A small amount of crystallization does occur when a solvent solution of the 2-ethyl hexanol-1 ester of 2,4,5-trichlorophenoxyacetic acid is subjected to temperatures of 0° F. for a prolonged period of time, while the same crystallization does not occur when the alcohol mixtures of the present invention are employed for the esterification.

I have found that no single heptanol, octanol, nonanol, or decanol is entirely suitable for the purposes of the subject invention.

In accordance with the present invention, I have found that the mixture of primary saturated decyl alcohols containing a major proportion of trimethyl heptanols produces a herbicidal ester possessing low volatility, coupled with a sufficiently high acid equivalency, and in addition, is quite soluble in fuel oil, will yield concentrated solvent solutions containing at least four pounds per gallon equivalent of herbicidal acids from which the ester will not crystallize out upon prolonged storage at temperatures as low as 0° F. and will produce, when emulsified with water, an emulsion of good stability.

The mixture of alchols of the present invention may contain, in addition to a major proportion of primary saturated trimethyl heptanols, other isomeric primary saturated decyl alcohols as well as small amounts of secondary and tertiary alcohols. In addition, minor proportions of $C_7$, $C_8$, $C_9$ and $C_{11}$ alcohols may also be present. The presence of other isomeric decyl alcohols in small quantity, as well as the presence of various $C_7$, $C_8$, $C_9$ and $C_{11}$ alcohols in small quantity is not especially noticeable. The presence of secondary and tertiary alcohols, while not unduly harmful, is not desirable.

The esters produced from a given alcohol and 2,4-dichlorophenoxy acetic acid usually melt 10° to 20° C. lower than the corresponding ester of 2,4,5-trichlorophenoxyacetic acid. The esters produced from a given alcohol and 4-chloro-2-methylphenoxyacetic acid usually melt 20° to 40° lower than the corresponding ester of 2,4,5-trichlorophenoxyacetic acid. It can consequently be seen that the problem of forming a highly concentrated cold stable solvent solution is more difficult in relation to 2,4,5-trichlorophenoxyacetic acid than it is with regard to the other acids which are the subject of the present invention. Although the problem is a pressing one in regard to all.

That the use of a mixture of primary saturated decyl alcohols containing a major proportion of trimethyl heptanols to esterify aryloxyacetic acids produces herbicidal compositions which are more cold stable than the usual esters possessing low volatility, can be seen from the following information:

Concentrated solvent solutions were prepared from one of the commonly used aromatic solvents, such as methylated naphthalene and xylene and the various esters of 2,4,5-trichlorophenoxyacetic acid. These concentrated solvent solutions were prepared to contain the equivalent of 4 lbs. of 2,4,5-trichlorophenoxyacetic acid as the ester per gallon.

The following alkyl esters of 2,4,5-trichlorophenoxyacetic acid did not produce concentrated solvent solutions stable at 0° F. with the above solvents: n-amyl, n-hexyl, methylamyl, methylcyclohexyl, octanol-2 (capryl), n-octyl, di-isobutylcarbinol, n-decyl, n-nonyl, lauryl, methoxy-methoxyethyl and cetyl. All crystallized out appreciably at 0° F.

On the other hand, concentrated solvent solutions prepared from the esters of the present invention were stable on storing for a prolonged period, i. e., 3 weeks at 0° F.

The following table shows the unexpected solubility of the mixture of esters produced by reacting a mixture of saturated primary decyl alcohols containing a major proportion of trimethyl heptanols with 2,4,5-trichlorophenoxyacetic acid in common kerosene in relation to other esters of 2,4,5-trichlorophenoxyacetic acid:

TABLE I

| Ester of 2,4,5-trichlorophenoxyacetic acid | Solubility in kerosene at 25° C. |
|---|---|
| n-amyl [1] | miscible. |
| n-hexyl [1] | miscible. |
| 2-ethylbutyl [1] | miscible. |
| octanol-2 (capryl) | 5 to 10%. |
| n-octyl | 5 to 10%. |
| n-decyl | 5 to 10%. |
| di-isobutylcarbinol | 5 to 10%. |
| lauryl | 5 to 10%. |
| cetyl | 5 to 10%. |
| 2-ethylhexanol-1 | miscible. |
| mixture of decyl alcohols of the present invention | miscible. |

[1] Unduly volatile.

In accordance with conventional practice, the herbicidal aryloxyacetic acid esters of the present invention may be used alone or in conjunction with one another, as well as in admixture with other herbicidal ingredients. For example, the ester of 2,4,5-trichlorophenoxyacetic acid with the alcohol mixture of the present invention may be used in admixture with either the esters of the present invention or other esters of either 2,4-dichlorophenoxyacetic acid or 4-chloro-2-methylphenoxyacetic acid, and the esters of 2,4-dichlorophenoxyacetic acid and 4-chloro-2-methylphenoxyacetic acid may be used in admixture. A 1:1 ratio of the esters of the present invention of 2,4,5-trichlorophenoxyacetic acid and 2,4-dichlorophenoxyacetic acid is illustrative.

Suitable solvents which may be employed for the purpose of compounding a concentrated solvent solution with the new esters of the subject invention are water insoluble or nearly water insoluble ketones such as di-isobutyl ketone and the like, water insoluble or nearly water insoluble esters such as dibuty phthalate, amyl acetate and the like, high boiling petroleum naphthas within the boiling range of about 100° to about 400° C. (the common petroleum naphthas that are generally used boil in the range of from 150° to 300° C.), kerosene or other hydrocarbon oils such as methylated naphthalene and xylene. Co-solvents such as dimethyl ketone and isopropyl alcohol may be employed, but it should be noted that the use of water-soluble co-solvents decreases the efficiency of emulsification of the concentrates. Suitable emulsifying agents have been previously referred to, and common nonionic emulsifiers which are commercially available, such as derivatives of polyoxyethylene, are generally used. Spreading agents and adhesives may also be employed, but because of the ability of the esters of the present invention to spread by themselves and resist washing off, these agents are not necessary.

The concentration of the herbicidal agent in the solvent may vary greatly, e. g., 5% to 95%, and still realize herbicidal activity. However, practicable solutions must be highly concentrated, and should contain at least approximately 4 lbs. of the herbicidal acid as the ester per gallon of total solution of the ester in the solvent.

In the preparation of oil-base sprays, about one to six gallons of the concentrated solvent solution are employed to twenty gallons of oil.

Aqueous emulsions of the solution generally contain from one to twenty-five quarts of the solution for each one-hundred gallons of water.

I believe that the ease of dissolving, and perhaps to some small extent, the solubility of various esters, depends on the physical state of the ester in question. Thus, esters that are liquid at a particular temperature are considerably easier to dissolve at that temperature and appear to show higher solubility than a very closely related compound which is solid at that temperature. If the cold stability of a four pound composition, as discussed previously, and the kerosene solubility, as discussed in Table I, are considered in the light of the melting points of the 2,4,5-trichlorophenoxyacetic acid esters listed in Table II, it will be seen that the mixture of primary saturated branched chain decyl esters of the present invention has a surprisingly lower melting point than the amyl, hexyl and 2-ethylbutyl esters which are themselves unsatisfactory for the purpose of the present invention because of high volatility, and is even more favorable than that of the 2-ethyl hexanol-1 ester.

TABLE II

| Ester | Approximate Melting point |
|---|---|
| n-amyl | 15° C. |
| n-hexyl | 26° C. |
| methyl amyl | 40° C. |
| octanol-2 (capryl) | 34° C. |
| 2-ethylhexyl | 12° C. |
| di-isobutylcarbinol | 54° C. |
| n-nonyl | 43° C. |
| n-decyl | 40° C. |
| lauryl | 48° C. |
| cetyl | 57° C. |
| mixture of decyl alcohols of the present invention. | could not be crystallized at 0° F. |

Several biological tests have shown that the esters prepared from a mixture of primary saturated decyl alcohols containing a major proportion of trimethyl heptanols possess lower volatility than the comparable tetrahydrofurfuryl, butoxy ethyl and butoxypropyl esters.

It will be appreciated that any mixture of primary saturated decyl alcohols containing a major proportion of trimethyl heptanols, i. e., 50% or more, may be used for the purposes of the invention. The position of the methyl substituents in the carbon chain of the trimethyl heptanol would appear to be immaterial.

I claim:

1. As a new herbicidal mixture of esters, the mixture of esters of an aryloxyacetic acid selected from the group consisting of phenoxyacetic acid, 2-methylphenoxyacetic acid, naphthoxyacetic acid and halogenated derivatives thereof, with a mixture comprising primary saturated decyl alcohols containing a major proportion of trimethyl heptanols said mixture including substantial amounts of a plurality of the trimethyl heptanols.

2. As a new herbicidal mixture of esters, the mixture of esters of 2,4,5-trichlorophenoxyacetic acid with a mixture comprising primary saturated decyl alcohols containing a major proportion of trimethyl heptanols, said mixture including substantial amounts of a plurality of the trimethyl heptanols.

3. As a new herbicidal mixture of esters, the mixture of esters of 2,4-dichlorophenoxyacetic acid with a mixture comprising primary saturated decyl alcohols containing a major proportion of trimethyl heptanols, said mixture including substantial amounts of a plurality of the trimethyl heptanols.

4. A herbicidal composition containing as the active ingredient the mixture of esters of 4-chloro-2-methylphenoxyacetic acid with a mixture comprising primary saturated decyl alcohols containing a major proportion of trimethyl heptanols, said mixture including substantial amounts of a plurality of the trimethyl heptanols.

5. A cold stable herbicidal concentrated solvent solution containing a herbicidal mixture of esters of low volatility comprising a solvent solution containing at least four pounds of equivalent acid as the ester per gallon of solution of at least one aryloxyacetic acid selected from the group consisting of phenoxyacetic acid, 2-methylphenoxyacetic acid, naphthoxyacetic acid and halogenated derivatives thereof, with a mixture comprising primary saturated decyl alcohols containing a major proportion of trimethyl heptanols said mixture including substantial amounts of a plurality of the trimethyl heptanols.

6. A concentrated solvent solution as recited in claim 5 in which the solvent has a specific gravity between 0.8 and 1.0.

7. A concentrated solvent solution as recited in claim 5 in which the solvent is a high boiling naphtha.

8. A concentrated solvent solution as recited in claim 5 in which the solvent is kerosene.

9. A composition as recited in claim 5 in which the same concentrated solvent solution is mixed with an oil of low aromatic content.

10. A composition as recited in claim 9 in which the oil is fuel oil.

11. A composition as recited in claim 9 in which the oil is diesel oil.

12. A cold stable herbicidal concentrated solvent solution containing a herbicidal mixture of esters of low volatility comprising a solvent solution containing at least four pounds of equivalent acid as the ester per gallon of solution of the mixture of esters of 4-chloro-2-methylphenoxyacetic acid with a mixture comprising primary saturated decyl alcohols containing a major proportion of trimethyl heptanols said mixture including substantial amounts of a plurality of the trimethyl heptanols.

13. A cold stable herbicidal concentrated solvent solution containing a herbicidal mixture of esters of low volatility comprising a solvent solution containing at least four pounds of equivalent acid as the ester per gallon of solution of the mixture of esters of 2,4-dichlorophenoxyacetic acid with a mixture comprising primary saturated decyl alcohols containing a major proportion of trimethyl heptanols said mixture including substantial amounts of a plurality of the trimethyl heptanols.

14. A cold stable herbicidal concentrated solvent solution containing a herbicidal mixture of esters of low volatility comprising a solvent solution containing at least four pounds of equivalent acid as the ester per gallon of solution of the mixture of esters of 2,4,5-trichlorophenoxyacetic acid with a mixture comprising primary saturated decyl alcohols containing a major proportion of trimethyl heptanols said mixture including substantial amounts of a plurality of the trimethyl heptanols.

15. A concentrated solvent solution as recited in claim 14 in which the solvent has a specific gravity between 0.8 and 1.0.

16. A concentrated solvent solution as recited in claim 14 in which the solvent is a high boiling naphtha.

17. A concentrated solvent solution as recited in claim 14 in which the solvent is kerosene.

18. A composition as recited in claim 14 in which the said concentrated solvent solution is mixed with an oil of low aromatic content.

19. A composition as recited in claim 18 in which the oil is fuel oil.

20. A composition as recited in claim 18 in which the oil is diesel oil.

21. A herbicidal aqueous emulsion of good stability which comprises an aqueous emulsion of a herbicidal concentrated solvent solution comprising a solvent solution containing at least four pounds of equivalent acid as the ester per gallon of solution of the mixture of esters of at least one aryloxyacetic acid selected from the group consisting of phenoxyacetic acid, 2-methylphenoxyacetic acid, naphthoxyacetic acid and halogenated derivatives thereof, with a mixture comprising primary saturated decyl alcohols containing a major proportion of trimethyl heptanols said mixture including substantial amounts of a plurality of the trimethyl heptanols.

22. A herbicidal aqueous emulsion of good stability which comprises an aqueous emulsion of a herbicidal concentrated solvent solution comprising a solvent solution containing at least four pounds of equivalent acid as the ester per gallon of solution of the mixture of esters of 2,4,5-trichlorophenoxyacetic acid with a mixture comprising primary saturated decyl alcohols containing a major proportion of trimethyl heptanols said mixture including substantial amounts of a plurality of the trimethyl heptanols.

References Cited in the file of this patent

UNITED STATES PATENTS

| | | |
|---|---|---|
| 2,614,919 | Warren | Oct. 21, 1952 |

FOREIGN PATENTS

| | | |
|---|---|---|
| 494,813 | Canada | July 28, 1953 |
| 494,814 | Canada | July 28, 1953 |
| 494,815 | Canada | July 28, 1953 |
| 494,816 | Canada | July 28, 1953 |
| 494,817 | Canada | July 28, 1953 |
| 494,818 | Canada | July 28, 1953 |
| 494,819 | Canada | July 28, 1953 |
| 494,820 | Canada | July 28, 1953 |
| 494,821 | Canada | July 28, 1953 |
| 494,822 | Canada | July 28, 1953 |
| 494,823 | Canada | July 28, 1953 |
| 494,824 | Canada | July 28, 1953 |

OTHER REFERENCES

Contrib. Boyce Thompson Inst., April—June 1953, page 244.